(12) United States Patent         (10) Patent No.:     US 8,930,548 B2
    Hallem et al.                 (45) Date of Patent:      Jan. 6, 2015

(54) MOBILE LINK SYSTEM, METHOD AND APPARATUS

(71) Applicant: Mobile Helix, Inc, Hoboken, NJ (US)

(72) Inventors: Seth Hallem, New York, NY (US); Matthew Bancroft, Hoboken, NJ (US)

(73) Assignee: Mobile Helix, Inc., New York, NY (US)

( * ) Notice: Subject to any disclaimer, the term of this patent is extended or adjusted under 35 U.S.C. 154(b) by 0 days.

(21) Appl. No.: 13/785,041

(22) Filed: Mar. 5, 2013

(65) Prior Publication Data

US 2013/0238808 A1     Sep. 12, 2013

Related U.S. Application Data

(60) Provisional application No. 61/607,341, filed on Mar. 6, 2012, provisional application No. 61/641,589, filed on May 2, 2012.

(51) Int. Cl.
    G06F 15/16    (2006.01)
    H04L 29/06    (2006.01)
    H04W 12/08    (2009.01)

(52) U.S. Cl.
    CPC ............ *H04L 69/03* (2013.01); *H04L 63/0281* (2013.01); *H04W 12/08* (2013.01); *H04L 63/0272* (2013.01)
    USPC ............................. 709/227; 709/230; 709/231

(58) Field of Classification Search
    USPC .......................................... 709/227, 230, 231
    See application file for complete search history.

(56) References Cited

U.S. PATENT DOCUMENTS

| 5,857,201 | A | 1/1999 | Wright, Jr. et al. | |
|---|---|---|---|---|
| 6,457,049 | B2 | 9/2002 | Lewis et al. | |
| 6,643,652 | B2 | 11/2003 | Helgeson et al. | |
| 6,895,234 | B1 | 5/2005 | Laursen et al. | |
| 6,938,158 | B2 * | 8/2005 | Azuma | 713/182 |
| 7,359,395 | B2 * | 4/2008 | Toporek et al. | 370/401 |
| 7,602,782 | B2 | 10/2009 | Doviak et al. | |
| 2001/0047421 | A1 * | 11/2001 | Sridhar et al. | 709/230 |
| 2003/0069926 | A1 * | 4/2003 | Weaver et al. | 709/203 |
| 2003/0087629 | A1 * | 5/2003 | Juitt et al. | 455/411 |
| 2004/0258053 | A1 * | 12/2004 | Toporek et al. | 370/352 |
| 2005/0041858 | A1 * | 2/2005 | Celi et al. | 382/173 |
| 2005/0266836 | A1 | 12/2005 | Shan | |
| 2006/0154660 | A1 * | 7/2006 | Waugh et al. | 455/428 |
| 2007/0094273 | A1 | 4/2007 | Fritsch et al. | |
| 2007/0192495 | A1 | 8/2007 | Marais | |
| 2007/0288359 | A1 * | 12/2007 | Amadio et al. | 705/38 |
| 2008/0140728 | A1 * | 6/2008 | Fraser et al. | 707/200 |
| 2008/0281908 | A1 * | 11/2008 | McCanne et al. | 709/203 |
| 2009/0119598 | A1 * | 5/2009 | Oztaskent | 715/733 |
| 2009/0217354 | A1 * | 8/2009 | Blum et al. | 726/3 |

(Continued)

OTHER PUBLICATIONS

International Search Report and Written Opinion dated Jun. 25, 2013 for PCT Application No. PCT/US2013/028977.

*Primary Examiner* — Lynn Feild
*Assistant Examiner* — Jonathan Bui
(74) *Attorney, Agent, or Firm* — The Mueller Law Office, P.C.

(57) ABSTRACT

A system is provided for communication between a mobile device and an Enterprise Network. A gateway provides an end-to-end connection between the gateway and the mobile device. A controller is adapted to interpret data from a proprietary protocol. The data is communicated between the Enterprise Network and the mobile device via the end-to-end connection.

15 Claims, 7 Drawing Sheets

(56) References Cited

U.S. PATENT DOCUMENTS

| | | |
|---|---|---|
| 2009/0296734 A1 | 12/2009 | Nag |
| 2010/0070570 A1* | 3/2010 | Lepeska .................... 709/203 |
| 2010/0093320 A1* | 4/2010 | Ha et al. .................... 455/414.1 |
| 2010/0265939 A1* | 10/2010 | Parlamas et al. ............. 370/352 |
| 2010/0265950 A1* | 10/2010 | Foxworthy et al. .......... 370/392 |
| 2011/0082940 A1 | 4/2011 | Montemurro et al. |
| 2011/0272144 A1* | 11/2011 | Belcher et al. ........... 166/250.01 |
| 2012/0023558 A1* | 1/2012 | Rafiq .............................. 726/6 |
| 2012/0084671 A1* | 4/2012 | Enete et al. .................... 715/756 |
| 2012/0136980 A1* | 5/2012 | Godfrey et al. ............... 709/223 |
| 2012/0137210 A1* | 5/2012 | Dillon .......................... 715/234 |
| 2012/0210166 A1* | 8/2012 | Bonefas et al. ................. 714/18 |
| 2012/0216271 A1* | 8/2012 | Cooper et al. .................. 726/12 |
| 2013/0007854 A1* | 1/2013 | Sorenson et al. ................. 726/5 |
| 2013/0024575 A1* | 1/2013 | Taylor .......................... 709/227 |
| 2013/0260811 A1* | 10/2013 | Rayavarapu .................. 455/509 |

* cited by examiner

MOBILE LINK SYSTEM, METHOD AND APPARATUS

RELATED PATENT APPLICATIONS

Priority is claimed from US Provisional Patent Application No. 61/607,341 filed on Mar. 6, 2012, and US Provisional Patent Application No. 61/641,589 filed May 2, 2012, both of which are incorporated herein by reference in their entirety for all purposes.

BACKGROUND

Enterprise Networks were originally used by businesses as a private computer network to interconnect various company sites (such as production sites, offices and shops) in order to share computer resources. The Enterprise Network is essentially a Virtual Private Network (VPN), built over a public or a non-secure infrastructure, using encryption to protect the data traffic from eaves-dropping.

SUMMARY

A system and method are described for providing communication between a mobile device and an Enterprise Network 106. A gateway 104 provides an end-to-end connection between the gateway 104 and the mobile device. A controller is adapted to interpret data from a proprietary protocol. The data is communicated between the Enterprise Network and the mobile device via the end-to-end connection.

DETAILED DESCRIPTION

A system, method and apparatus are provided to deliver data to and from a private or secure data source (for example, a web server, web service, database, or other server) to a mobile device that is connected to a public or non-secure network. Mobile devices may include cell phone and other mobile devices including personal digital assistants, smartphones, tablet computers, etc. A telecommunications network may be considered as a collection of terminals, links or nodes which connect to enable telecommunication between users of the terminals. Each terminal in the network may have a unique address so that messages or connections can be routed to the correct recipients. The collection of addresses in the network is called the address space. The links connect the nodes together and are themselves built upon an underlying transmission network which physically pushes the message across the link using circuit switched, message switched or packet switched routing. The inventive solutions provide communication to an Enterprise Network which may be considered more broadly as a computer network built by a business to interconnect its various company sites or applications (such as production sites, offices and shops) in order to share computer resources.

In one sense, the inventive solution provides a connection and/or communication between a mobile device and an Enterprise Network. In general, however, the solution provided applies to any network. However, taking as a context the Enterprise Network the mobile device is in one aspect not connected directly to the Enterprise Network. This may be provided, for example by a gateway. This is in contradistinction with existing solutions such as Mobile VPN that requires a direct connection between the device and the Enterprise Network. Although, the instant solution is different than VPN, it may be considered to provide "Virtualization" of the device file system to intercept all requests for data objects and to fulfill those requests using cached data whenever possible may be provided. However, this is distinct from traditional VPN systems. Thus, the solution provides a satisfactory connection to the Enterprise Network. The solution also provides access to any type of network, and the solutions provided herein apply equally to those networks.

Figure 1:
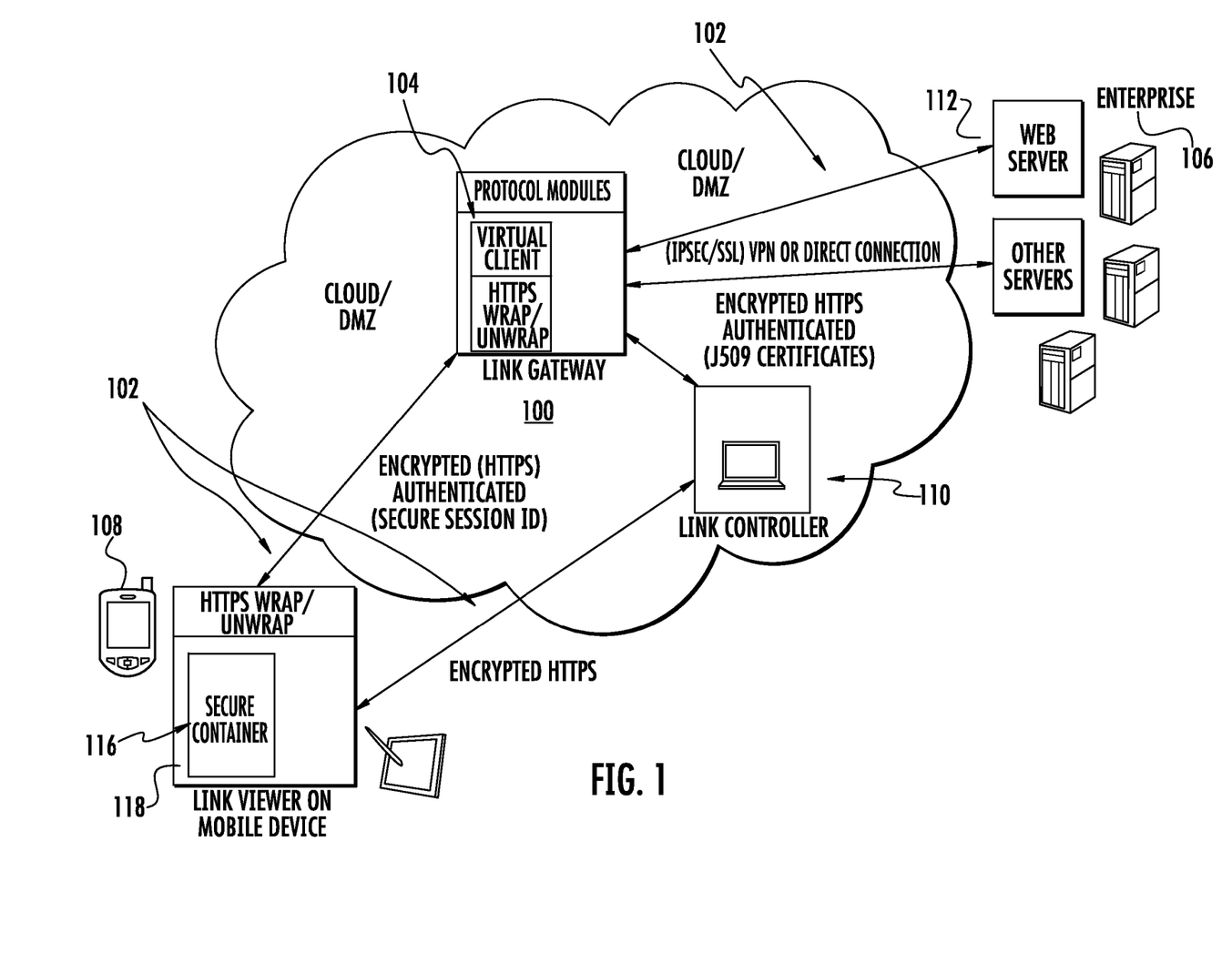
FIG. 1 illustrates an initial setup and provisioning.

Now with reference to FIG. 1, the system, method and apparatus shall be described in the context of a secure connection 102 between a gateway 104, an Enterprise Network 106 and a mobile device 108 which may be accomplished with the use of a controller or link controller 110. Content servers 112, such as Web Servers, Web Services, Databases, FTP Servers, File Servers, etc., may be provided within the network or network. The gateway 104 can be deployed on premise, that is supported by the Enterprise Network, where a direct connection is used, or the gateway 104 may be deployed in the Cloud 114 where a VPN or other secure connection 102 may be used to connect the gateway 104 to the Enterprise Network 106. A viewer 118 may be provided, for example, as an application on the mobile device 108. The viewer 118 may be considered similar to a browser that interprets Markup language and displays the language and associated information in the form of a graphical representation. The viewer 118 may be directly provided in order to increase security. That is, the viewer may be deployed either via a public app store (the Apple "App Store" or Google "Play") or via a private, enterprise managed or owned app store.

The mobile device 108 is provided with a means to display a visual to the mobile user. A visual display is most often defined by a single HTML page and its referenced style sheets, scripts, and dependent objects, although other formats can be supported. The visual display may be rendered using the available capabilities of the device. In one embodiment, the viewer receives data packages from the gateway 104 via HTTPS. When a package is received it is unencrypted and uncompressed. If the package contains multiple objects, those objects may be separated in the decompression step. The data within a package is divided into objects/data defining the visual layout to be rendered on the device and dependent objects, which are objects referenced by and incorporated into the former.

For example, HTML pages are rendered using the browser controls available in Apple's iOS, Google Android, and other operating systems. Existing solutions like Mobile VPN establish a connection that is available to applications running on the device. Visual display of standard HTML data delivered in a non-standard package is also contemplated and is possible with this arrangement.

In the alternative or in addition to, a viewer may be provided in association with the mobile device. The viewer may be provided by an application. In one aspect, only the viewer application is permitted to connect to and receive data from the Enterprise Network 106. In one embodiment, when a user opens the viewer, the authentication procedure is implemented. If this procedure is successful, the viewer receives an encryption key, a secure session ID, a gateway 104 URL, and a list of authorized applications from the controller.

In one variation, a policy may be applied to the viewer. The policy may define device capabilities that should be limited/disabled to protect sensitive corporate data (e.g., screen capture, copyrighted works, confidential material, age sensitive material, etc.).

The application in one aspect optimizes traffic between the Enterprise Network 106 and the mobile device on-the-fly, by inspecting data as it passes through the gateway 104 and using compression and pre-fetching to optimize the traffic stream. This could be, for example, realized through the following procedure.

In this embodiment, when traffic arrives at the gateway 104 from the network it is forwarded to the appropriate protocol plugin based on the protocol of the originating request (see above). Using the HTTP plugins as a representative example, the plugin may be responsible for and may provide: HTML pages and CSS pages often refer to other images, script files, html pages, etc. The plugin identifies the dependent resources referenced and fetches them from the network web servers without necessarily communicating to the viewer. This is referred to herein as pre-fetching. This technique can be extended to include references programmatically retrieved using Javascript by executing the Javascript code in an html page prior to transmitting that page to the viewer.

Data passing through the gateway 104 may be modified to improve its visual presentation on the device, improve compatibility with device side features and capabilities, or otherwise to optimize the user experience on the device. An example used in the HTTP plugin is modification of Javascript code to improve compatibility with the browsers on iOS devices. Another example is the injection or modification of style elements either in html or CSS to improve the visual presentation of data on the device. For example, the gateway may place a block of Javascript code at the top of each page. That Javascript code may be used to modify the style or look of a page and may even be used to override native Javascript functionality. In the alternative or in addition thereto the gateway 104 intercepts Javascript-generated web requests and tracks them. Rendering may otherwise continue the same as would occur in any web browser.

De-duplicating is provided to detect when data is already cached by the viewer and sending references to that data rather than transmitting the actual data. In the HTTP plugin, de-duplication occurs at the object level. For example, when a script, image, html page or other object passes through the plugin it is fingerprinted using MD5 or another similar technique. These fingerprints are stored both by the viewer and the gateway. When the gateway 104 encounters a fingerprint it has already sent to the viewer, it sends the fingerprint in lieu of the identified object. Otherwise it sends the object along with its fingerprint so that the viewer can maintain the reference between fingerprint and object. In other protocol handlers, data can be duplicated at the level of files, binary chunks, or using any other technique of dividing the data into uniquely identifiable blocks.

A batching operation retrieves objects through pre-fetching and assembles them into a single package prior to compression and transmission to the viewer. The contents of the batched package may then be compressed to a minimal form using a standard compression algorithm such as gzip, zip, Z-lib compression, etc. Compressed packages are then sent to the viewer via HTTPS along with HTTP header flags indicating the application from which that data was retrieved. By identifying the origin application, the viewer can correspondingly determine the underlying protocol and technique for unpacking and utilizing the transmitted data. The batching of multiple objects into a single or fewer packages prior to compression and transmission to the viewer may minimize roundtrips to/from the gateway. Protocol proxying may also be provided to respond to protocol messages on behalf of the viewer whenever possible to avoid unnecessary roundtrips to/from the gateway. For example, HTTP redirects in the gateway 104 are processed without transmitting the redirects to the viewer.

The application, thus, delivers applications hosted in the network to the mobile device unaltered. It does not necessarily require new applications to be created or application specific translations to be performed in order to view the application on the mobile device. On the other hand, the inventive solutions also provide for modification of the data visualized based on user roles or policies, etc., as will be explained.

Initial Setup and Provisioning

As a general description of the operation, the inventive solution shall now be described in terms of setup and provisioning. As a general matter, traffic is sent to the gateway 104 via HTTPs. All traffic may also be compressed, for example, using standard compression techniques. As will be explained, the gateway 104 may be designed using a plugin based architecture such that each supported protocol for communication to/from the Enterprise Network 106 is implemented by a single plugin. Examples include plugins for http, ftp, LDAP, and https.

In the other direction, the viewer may also originate traffic. For example, requests for data from the Enterprise Network 106 may be originated from the viewer by selecting an application to interact with. Each application is identified uniquely, for example, by an ID number that is shared between the viewer and the gateway.

When traffic arrives at the gateway 104 from the viewer it may be forwarded to the appropriate plugin by reading the application ID and looking up the appropriate protocol for that application. In the case of a single application utilizing multiple protocols, either additional headers may be provided in the incoming data to identify the protocol or the contents of the incoming message may be used to infer the protocol. Using the HTTP plugin as a representative example, the plugin may be responsible for and may provide:

Decrypting the incoming traffic.

Uncompressing the incoming traffic. All data required by the incoming request from the viewer may be sent in a single transmission.

Translating the incoming data into a protocol-appropriate request to the referenced network server. The underlying protocol and the mechanism of addressing the network server is determined according to the protocol standard. For example, the HTTP protocol plugin uses the incoming application ID to construct a URL identifying a network web server, and it uncompresses/decrypts the body of the transmission to identify any body data that should be forwarded to the network web server as part of an HTTP POST or PUT request.

Traffic is then forwarded to the Enterprise Network 106 according to the appropriate protocol standard. Traffic received in response to this request is processed as outlined below.

Secure Connection

With the above, it may be considered that a secure connection 102 is established between the gateway 104 and the Enterprise Network 106. This connection allows the gateway 104 to access content servers (Web Servers, Web Services, Databases, FTP Servers, File Servers, etc.) 112 within the network. The gateway 104 can be deployed on premise, that is supported by the Enterprise Network, where a direct connection is used, or the gateway 104 may be deployed in the Cloud 114 where a VPN or other secure connection 102 may be used to connect the gateway 104 to the Enterprise Network 106. The mechanism for establishing this secure connection 112 is flexible, and in one aspect is designed to match existing standards or technologies used within an network. This mechanism may be updated as new technologies are available for establishing such a connection.

Turning now to the secure connection, an example implementation of a viewer running on a mobile device establishes an authenticated session using one or more of the following:

Users authorized to use the system are uniquely identified by a username. The username has a set of associated secret authentication credentials, which are used to validate the identity of an individual accessing the system. Authentication credentials are either stored in the controller or in a naming system (e.g., LDAP, Active Directory) hosted by the network.

Devices are also authenticated by explicitly provisioning devices in the controller. Provisioning in at least one example means defining a record that specifies a list of device attributes and an authorized user connected to the device. Device attributes may include generic attributes such as device type, operating system, etc. as well as unique attributes such as a device-specific identification number. In one embodiment, when a device attempts to access the system, it must be authenticated by the controller by comparing the device's attributes against devices provisioned to the authenticated user using the device.

When a user launches the viewer on a mobile device, the viewer requests the user's authentication credentials. These credentials along with the device's attributes are sent to the controller for authentication. Authentication occurs by first authenticating the user. This is done, for example, either by comparing the supplied credentials against those stored in the controller or by relaying a message to the gateway, which then transmits a message to the naming service in the Enterprise Network 106. Once the user is authenticated, the device is then authenticated. If one or preferably both authentication steps succeed then the combination of device and user (hereafter called a Principal) is granted a secure session ID, the IP address of a gateway 104 to connect to, an encryption key for on-device encryption, and a role.

In single-sign-on systems (SSO), authentication can also occur via a designated SSO server, for example a SAML 2.0-compliant identity server such as OpenAM.

One mechanism for provisioning, for example, is the use of provisioning so that users, i.e., individuals within a company who are authorized to use the system, are provisioned. Provisioning refers to preparing and equipping a network to allow it to provide (new) services to its users. For instance, the OASIS Provisioning Services Technical Committee (PSTC) defines an XML-based framework for exchanging user, resource, and service provisioning information, e.g., SPML (Service Provisioning Markup Language) or SAML (Security Assertion Markup Language) for "managing the provisioning and allocation of identity information and system resources within and between organizations". Each user, in one aspect, is uniquely identified by a username. Each username may have a set of associated secret authentication credentials, which are used to validate the identity of an individual accessing the system. Each user may also be associated with personal information (for example, first name, last name, and e-mail address, etc.), and/or roles, which are described below.

The most common form of credentials is a secret password, although networks may also use multi-factor authentication schemes (for example, RSA SecureID or other common multi-factor authentication schemes). When a user accesses the system, he/she is authenticated (i.e. his/her identity is verified) by requesting a username and the corresponding authentication credentials, then validating the supplied information in, for example, one of the following ways.

The controller 110 may be managed to provide further secure connectivity. For example, users and passwords are stored in the controller 110 database. When a user is authenticated, the username and password are checked against the encrypted versions of those credentials stored in the controller 110 database. This is may be a practical manner in which to provision users to the system.

Information validation may also be delegated. For example, the controller 110 is connected to a Web Service 112 hosted inside the Enterprise Network 106 but accessible via the public internet. A secure connection 112 to that web service is used to supply the username and authentication credentials to the Web Service 112 for validation. Users may still create in the controller 110 and are associated with personal information and roles that are (optionally) imported via the same Web Service 112. However, in one aspect, authentication credentials are not stored in the system for security purposes.

In an integrated model, the gateway 104 uses the secure connection 102 established to communicate directly with the network LDAP/Active Directory/or other naming directory system. Usernames and authentication credentials sent to the controller 110 may be relayed to the gateway 104 for validation in this manner. Similar to the delegated model, authentication credentials are optionally not stored in the controller 110 for security purposes. The secure connection 112 is established without directly connecting the mobile device to the Enterprise Network 106. This allows for and there is provided substantially instant revocation of access rights and it provides an additional layer of protection against rogue or malicious communication attacks.

The integrated authentication model may also be integrated with single sign-on systems based on standards such as SAML or OpenID. In this case, authentication credentials are forwarded to the single sign-on server in compliance with the single sign-on protocol.

It shall be appreciated that a secure connection 112 is established regardless of the underlying protocol used by the application or service hosted in the network. Even when the application/service uses an insecure, unencrypted protocol, the system still provides an end-to-end secure connection 102. The system enables the authentication of users and devices accessing the system such that only users and devices explicitly allowed to access the system can establish a secure connection 112 to network applications/services.

In one embodiment, a secure connection 112 is established between the gateway 104 and the Enterprise Network 106 when the gateway 104 is first launched using VPN or any similar technique for establishing a secure connection 112 between two fixed endpoints. This connection allows the gateway 104 to access content servers (Web Servers, Web Services, Databases, FTP Servers, File Servers, etc.) within the network and naming services (LDAP, Active Directory etc.).

In another embodiment, a secure connection 112 is established between the controller and the gateway 104 via https. Communication between the controller and the gateway 104 occurs via web services hosted on the gateway. In this embodiment, the controller 110 can only access the Enterprise Network 106 via the exported services available on the gateway, and the controller 110 is not connected to the Enterprise Network 106 in any way.

In another embodiment, when a user initiates an application access from the viewer, the viewer's secure session ID is sent to the gateway 104 for authentication via https. If successful, the user may now access the application through the gateway 104 by communicating with the gateway 104 via https. In one example, Session IDs are valid until they are either Explicitly revoked from the controller by deleting the provisioned device or deleting the user in the controller. Expired after a configurable period of idle time.

One or more techniques described results in an end-to-end secure channel being established regardless of the underlying protocol or application technology supported by the network application.

Once Users have been provisioned, each User may be assigned one or more Roles that provide an even further secure connection. All security policies may be set on a role by role basis. For that matter, roles may be applied to users either one by one or by associating a role with a group of users. Roles may be used with the present solution to control which applications a user is allowed to use, and/or what web pages/actions within the controller a user is allowed to view/execute. For example, using the principal's role, the controller 110 determines a list of authorized applications (destination addresses within the Enterprise Network 106) that are transmitted to the device along with meta data about those applications (icon, name, description, etc.) The system enables authorization of user access rights using a role-based scheme that is imposed independently of any such scheme implemented within the Enterprise Network 106. This enables a more restrictive set of authorization permissions to be implemented for mobile access to applications and services.

Mobile Device Provisioning

Now the provisioning of devices shall be described in more detail with respect to the mobile device 108. In order for a mobile device 108 to access the system that device is normally provisioned. Devices are provisioned by initially creating, for example, a record in the controller 110 containing:
Device Attributes—e.g., individual device IDs, device identities, types, operating system and version, capabilities etc. and/or,
Device Owner—the device owner is a provisioned user in the system who is associated with the device.

When a mobile device 108 accesses the system, the device attributes stored in the controller 110 are matched against the attributes supplied by the mobile device 108 attempting to access the system. A device is only deemed to be authorized, for example, if the attributes of the accessing device match the attributes of a provisioned device. It is possible that more than one provisioned device will have attributes that match the mobile device accessing the controller. For that contingency, the following further provisions may be taken.

Once the device is authorized, the user of the mobile device may be asked to supply his/her username and authentication credentials. If this information is validated, the controller 110 then ensures that the supplied username matches the device owner of exactly one of the provisioned devices determined to match the mobile device's 108 attributes. If this unique match is found, access to the system is authorized.

Secure Container

A secure container 116 application may be provided or downloaded to the mobile device 108. The secure container 116 may be considered a native mobile application that runs on each mobile device 108 supported by the application (e.g., iPad, iPhone, Android, Blackberry, Windows Mobile, etc.). The secure container 116 application may be downloaded to the mobile device 108 using the standard mechanism provided by a mobile device platform (e.g., the Apple App Store; Google Play; Blackberry App World, or a privately owned and managed App Store; etc.).

In one sense, the secure container 116 may refer to an application, process, or component of an application that intercepts requests and responses to or from the operating system made by another application or application component. This may be implemented by inserting a software layer in between the operating system and the application such that the API (application programming interface) calls executed by the application are interpreted and run by the software rather than run directly by the operating system. In other words, and as an additional security feature, the data or objects are interpreted at the application level or layer of the mobile device 108. The secure connection 112 is established at the application level, or application layer, so that other applications or processes running on the device cannot share or are at least limited from this secure connection 102.

Further, the secure container 116 may modify those requests or the data communicated between an application and the operating system in order to modify the functionality of the combined system. For example, the requests may be modified to add encryption/decryption and or compression/decompression. The purpose of the container 116 is in one sense to separate the protected application from the other applications that access the operating system. Thus, on device data processing of traffic delivered to the mobile device may be provided within a secure partitioned container. Creation and maintenance of a secure container on the device for viewing network data and communicating with the gateway 104 is thus provided.

Gateway Provisioning

Provisioning of the applications to the gateway 104 shall now be described, as follows. Applications are, in one aspect, destination URLs within the Enterprise Network 106 that mobile users should have access to. These may be URLs describing web-based applications hosted within the intranet. They could also be, for example, services that do not have any visible user interface but are made accessible to other applications running on the mobile device 108 via the system. The system provisions applications by connection to these URLs. In one aspect, the system ensures that all accesses initiated from a mobile device 108 to the Enterprise Network 106 are directed to a provisioned application (identified as a URL and all of that URL's sub-directories). Applications that may be provisioned, also referred to here as managed applications, may also include existing native applications that have been integrated with the present solution so that application are enabled to run on the mobile device inside the secure container and are manageable by the Controller.

Application Security

Applications may also have additional attributes, such as a user-friendly name, description, icon, etc. Applications may also be associated with a list of roles, which defines the groups of users who are able to access that application.

As shown in FIG. 1, the described steps may be considered as a method incorporating one or more of the following steps. In step 1 of FIG. 1, a secure connection 102 is established with a network. The connection may be through the use of a VPN which may be on premise, or through another secure connection 102. In a step 2, the users are provisioned using a managed controller 110, or a delegated external system (not shown). In a step 3, device attributes are set and/or device owners are specified. In a step 4, a secure container 116 is installed, for example, by downloading a secure container application to the mobile device 108. In a step 5, the applications are provisioned to the gateway 104.

Authenticate User and Device and Establish Session

The procedure for initiating a connection to a network-hosted application via the system shall now be described with reference to FIG. 2.

Authenticate User and Device

When a user launches the viewer 118 on the device, the viewer 118 may ensure the identity of the user and determines what applications that user is authorized to access. This authentication and authorization may be performed as follows.

The user's username, authentication credentials, and the attributes of the device (described with reference to FIG. 1) may be encrypted and transmitted to the controller 110. This transmission may be performed via HTTPS as shown by reference numeral 202 in FIG. 2. All communication between the viewer and the gateway 104 may occur via https. When the underlying application supports a different protocol (e.g., http), the underlying protocol is wrapped in, for example, an https package before being transmitted to or from the viewer. However, encryption may be accomplished using any standard, secure protocol.

The controller 110 identifies one or more provisioned devices that match the attributes provided in this first communication. If no provisioned devices match, access is denied.

The controller 110 confirms the user is provisioned in the system and validates the user's authentication credentials via the configured mechanism (see previous section).

The system checks for a match between device owner for one of the matching provisioned devices and the authenticated username. If a match exists, the system may create a unique ID that encapsulates the attributes of the device so that in the future the list of provisioned devices can be selected using this ID. The ID may be stored on the controller 110.

Figure 2:
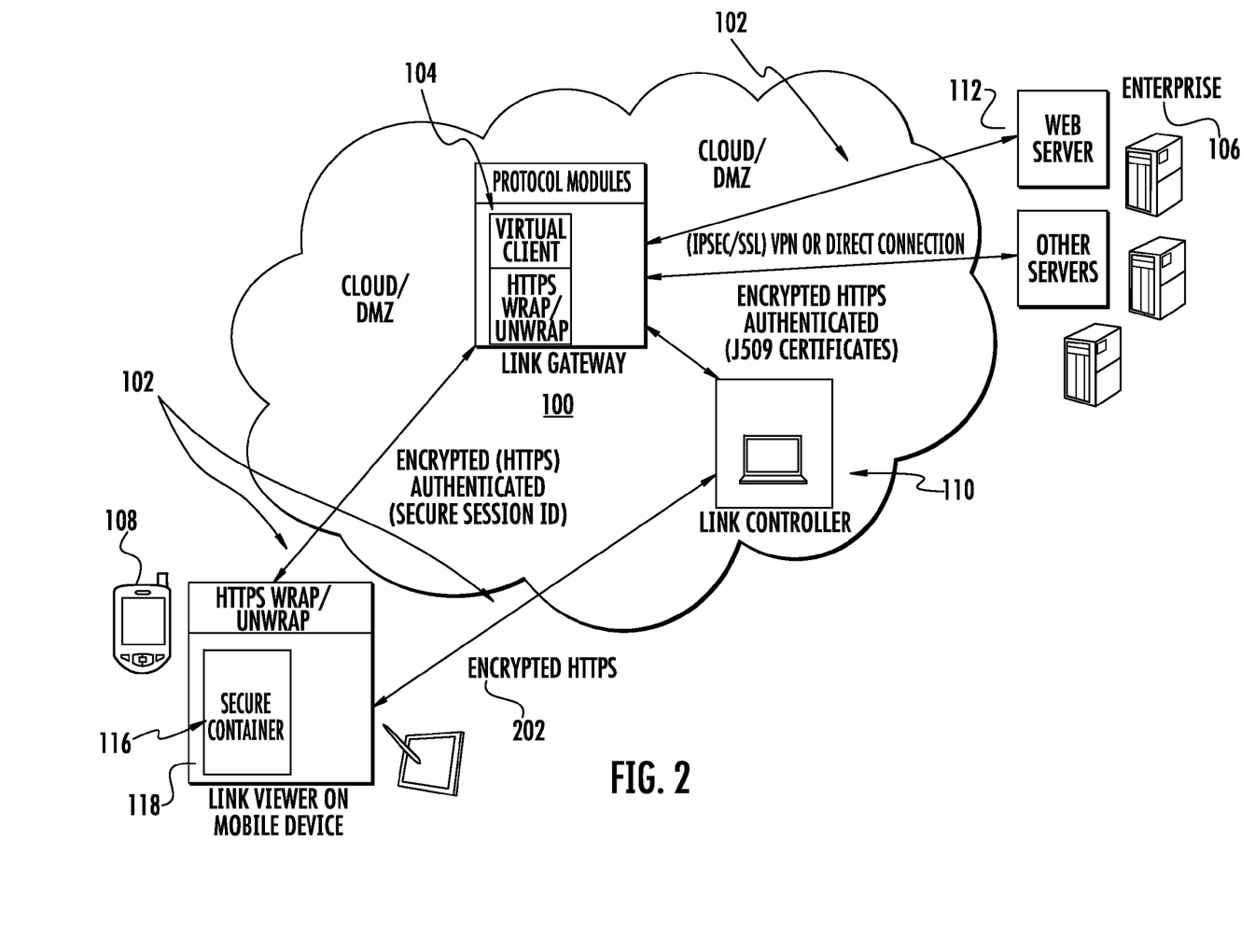
FIG. 2 illustrates an authenticate user and device and establish session.

FIG. 2 illustrates steps that can be considered in terms of a method of an embodiment of the invention. In a first step, the user and device are authenticated before launching. In an alternative second step, the secure session ID is sent to the mobile device and/or gateway 104 and a shared secret may be created. In a third step, an encryption key is sent to the device from the controller 110. In a fourth step, applications are deployed to the device. For example, a Secure Session ID may be sent to Device and Gateway 104 and a Shared Secret may be created.

Once authentication has been completed, a secure session ID may be sent to one or both the mobile device 108 and the gateway 104 to create a shared secret to be used to authenticate communications between the mobile device 108 and the gateway 104.

An encryption key using, for example, a standard, strong encryption algorithm (e.g., AES-256) is then generated for the unique provisioned device. That encryption key is sent to the device from the controller 110 to allow the viewer 118 on the device to encrypt and decrypt data that it receives. Subsequent to the first access by a device, the stored encryption key may be sent rather than generating a new one each time a user accesses the system from her mobile device 108. In this manner, the gateway does ensure that only users specifically granted permission to an application are allowed to access that application.

Deploy Applications to the Device

Applications may be deployed to the device 108 based on User roles and policies. Using the validated username, the list of roles that user belongs to is identified, and applications provisioned in the system are selected based on the membership of those applications in the user's roles. The controller may send that list of applications to the viewer 118. The viewer 118, for example, receives a unique ID for each application, the application's name and other user-presentable attributes (description, icon, etc.), and a partial URL that is a relative path from the appropriate server address within the Enterprise Network 106 to the application. To enhance security, addresses (IP addresses/DNS names) of servers in the Enterprise Network 106 may be restricted, or not sent to the mobile device.

Deploy Applications to the Gateway

The same set of Apps may be deployed to the gateway. The gateway, for example, receives unique app IDs, server addresses, and partial URLs so that the gateway 104 may generate a full, unique or partially unique URL identifying a destination address for any access of an network application from the mobile device 108.

Launch Data Session

The user Launches Application on a mobile device. The launch data session shall now be described with reference to FIG. 2. To access an application via the system, for example, by opening the viewer on the mobile device, authenticating, and then taking action to "open" one of the applications the user is authorized to access according to the process already explained. This may trigger an HTTPS request from the viewer to the gateway 104, which may include customer headers in accordance with the HTTP standard. These customer headers may transmit the Secure Session ID, the App ID, and the unique ID of the device.

The Session ID and the Device ID may be used by the gateway 104 to authenticate the origin of the incoming connection. In one alternative, there may be provided a timeout watchdog. After a certain period of inactivity, Session IDs are automatically invalidated. In addition, administrators of the system may delete provisioned devices from the controller user interface, which invalidates any Session IDs associated with that app ID.

If the connection is authenticated, the App ID is then used by the gateway 104 to authenticate the App request and to generate a full URL.

Gateway Translates URL

The gateway 104 may translate the URL supplied by the viewer 118 using the App ID to lookup the server address of the server in the Enterprise Network 106 and then appending the URL path supplied in the request to the gateway 104. For example, if the network is hosting a web application at http://server1.companyx.com/app1, this application has been provisioned in the system with unique ID 1, and the user attempts to access a page index.html within that application, the following steps may be provided:

A request is sent to the gateway 104 with the Session ID, Device ID, App ID (1 in this case), and a URL path that does not include any server address (/app1/index.html).

The gateway 104 validates the Session ID and Device ID. The gateway 104 then uses the App ID to lookup the server path—http://server1.companyx.com—and generates a full URL to send to the Enterprise Network 106—http://server1.companyx.com/app1/index.html. In this case by concatenating the server path with the address for the App.

The gateway 104 may also allow the viewer to send a new server address to the gateway 104. Server addresses may be embedded in the HTML content of a web application, so even though these addresses are never transmitted from the controller 110 to the viewer 118, the viewer 118 may attempt to access a link that includes a server address. In this case, the gateway 104 ensures that the constructed URL using the server address supplied by the viewer 118 and the URL path supplied by the viewer 118 correspond to an authorized application in the system. If not, an error may be returned.

For example, if an embedded HTML link in the application with unique ID 1 (from the previous example) in the system refers to http://server2.companyx.com/app2/entry.html, then when this link is clicked the full path is sent to the gateway 104. The gateway 104 then ensures that there is an app configured in the system with the server http://server2.companyx.com and that access has been authorized to the URL path /app2 and all of its sub-directory URLs. If these conditions match, the full URL is forwarded to the Enterprise Network 106.

Send Request to Enterprise Web Server

The gateway 104 may send an encrypted and secure request to the enterprise web server 112. This connection is secured, for example, by using VPN to securely tunnel into the Enterprise Network 106 and then using HTTP to communicate the request unencrypted within the Enterprise Network 106. In an alternative, an HTTPS request may originate from the gateway 104 to secure the connection between the gateway 104 and the Enterprise web server 112 end to end.

While a web server 112 is used in this case for the purposes of illustration, this request can be directed to any server within the Enterprise Network 106 that supports a standardized or proprietary communication protocol for communication over the network. Examples include requests to databases, FTP servers, web services, terminal applications, etc.

Detect Redirects

In response, the enterprise web server 112 may return an HTTP code indicating a redirect to another address. In this case, the gateway 104 may detect this redirect and re-queries the Enterprise Network 106 for the redirected URL so that it can navigate to the correct page. This redirect may be performed without any involvement of the mobile device 108, which avoids the cost of a roundtrip communication from the gateway 104 to the mobile device 108.

This procedure or routine can occur multiple times in the case that the enterprise web server 112 responds to the request generated with another redirect.

Response Received by Gateway

The Enterprise web server 112 may transmit the content identified by the URL back to the gateway 104. If this content is HTML, CSS, or another supported format, for example, then the gateway 104 may parse the content and looks for references to other resources stored on the Enterprise web server 112. For example, an HTML page may reference images stored on the Enterprise web server 112 that must be retrieved in order to properly display the HTML page. Referenced resources are most often images, CSS files, Javascript files, or XML files, but they can be any format or type of data.

The gateway 104 may be arranged to retrieve as many identified resources as it can prior to sending any communication back to the mobile device 108. This ensures a minimal number of roundtrips between the mobile device 108 and the gateway 104.

In addition, if the HTML page includes or references Javascript code that is executed upon loading of the HTML page in a browser, the gateway 104 may be configured to execute that Javascript code to determine if it will initiate any resource requests. If so, these resource requests may also be pre-loaded to avoid unnecessary roundtrips from the mobile device 108 to the gateway 104.

The gateway 104 may repeat this process of inspection and resource requests until all required resources are retrieved and delivered to the gateway 104. This process may not be guaranteed to catch 100% of all resource requests, and in the event that the viewer 118 identifies additional resources to retrieve, the viewer 118 will initiate new requests to the gateway 104 to retrieve those resources.

Traffic Modified by Gateway

As HTML, javascript, CSS, and other types of resources pass through the gateway 104, the gateway 104 may modify the content of those resources by editing or adding new content to them. For example, the gateway 104 may modify or inject new JAVA Script code to enhance browser compatibility on different mobile devices 108 by providing additional code specific for a particular type of mobile device. The gateway 104 may also modify or add style sheets to improve visual rendering of content on the mobile device 108. These modifications may be pre-stored in the gateway according to the inventive solution.

Package Page in the Gateway and Send to Mobile Device

Once all resources have been retrieved and traffic has been modified, the resulting collection of files may be compressed, packaged, and sent to the mobile device 108. This package may identify the main page to load (e.g., the main HTML page) and it may modify all references to resources including in the package generated in this step such that the viewer will retrieve those resources from the supplied package rather than re-querying the gateway. The format of the transmitted package is diagrammed in FIG. 3 and shall be discussed with reference to that figure.

FIG. 2 further illustrates the foregoing features in terms of method steps. In a first step, the HTTPS request is triggered to the gateway 104 when the user opens or otherwise accesses an application. In response, the gateway 104 translates the URL using the APP ID entry page in a second step. In a third step, the request is sent to the network web server 112 from the gateway 104. In a fourth step, the web server 112 redirects and re-queries the Enterprise Network 106. The response is received in the gateway 104 in a fifth step and the request is unpacked and the traffic is modified as already explained. In addition, image optimization is also contemplated by the solution to make an image sent to the device smaller by, for example, adding style sheets to override the existing style sheets embedded in the page. In a sixth step, signatures are matched with a mirrored device cache or similar storage device. For example, a signature (e.g., an MD5) is computer for each resource that is going to be sent to the device. Prior to packaging these resources, it is determined if a resource with the same MD5 already exists on the device. If so, only the resource MD5 is sent—not the actual resource contents. Resources are then packaged and a page is created to send to the mobile device in a seventh step. In step 7, the reduced package (reduced in step 6) is combined into a single package, compressed using standard compression techniques, and sent to the device.

Deliver Page to Device

With respect to FIG. 2, a send page to virtual device container will now be described. The gateway 104 sends the package generated to the viewer 118, which is a secure container 116 running on the mobile device 108 as already described. This transmission may be secured via HTTPS, although any other encryption technique may be used. All unpacked objects may be encrypted using a strong encryption key provided to the viewer when the authentication procedure completes successfully and are cached on the device in a location that is unique to the application and the authenticated user. An association may be maintained between the finger prints of stored objects and the location of the stored object.

Decrypt and Unpack Page

The viewer 118 decrypts the data according to, for example, the encryption algorithm used for the transmission (HTTPS or otherwise). The viewer 118 may then unpack the multiple resource files including in the transmission. This unpack step is executed in accordance with, for example, the compression algorithm used to generate the package in the previous step. Any standard or proprietary compression/de-compression algorithm may also be used.

Real-time decompression and unbundling of multiple data objects supplied, for example, in a single, encrypted, compressed package thus may be provided. There is optionally provided real time data processing of traffic from network applications/services and viewers in the gateway 104 to encapsulate traffic inside proprietary protocol for the purposes of security and performance acceleration. As a result, there is encapsulation of all traffic into the gateway 104 via https such that communications to/from the viewer are secured. This real-time processing of http is performed to, for example, identify and pre-fetch dependent resources referenced by an html page, CSS page, or other object.

The viewer may also include non-http APIs, for example, Javascript-based APIs for accessing non-http data, such as objects retrieved via ftp, directory entries retrieved via LDAP, records retrieved from a database via ODBC, etc. Additional languages and protocols may be supported when needed. The viewer may also include Javascript-based APIs for accessing device capabilities such as GPS system, gyroscope, location, etc. Additional languages and device capabilities may be supported when needed.

Store Cacheable Objects

Once unpacked, objects may be stored on the device in a cache that is indexed by App ID and the URL path of the resource. In one example, all objects are cached that are not explicitly marked as un-cacheable according to the rules defined by the HTTP 1.0 and 1.1 protocols. In other words, unless the enterprise server has used the standard protocol headers to mark an object as "no cache" then the solution in this example proceeds to cache it. The method for marking an object as un-cacheable is described in the HTTP 1.0/1.1 standards and the technique of marking shall not be repeated here.

To continue, all resources may be stored in encrypted form using the encryption key supplied to the viewer 118 as a result of the authentication procedure. Because all stored data is encrypted and managed by keys held by the viewer 118, referred to above as a "secure container" on the device, the inventive solution provides an even further secure solution.

Cookies required for each App may be stored on the mobile device 108 in encrypted form. These may be used to recall user settings or parameters used in previous applications. They may also be used to store other information about the user. In this embodiment, all requests for referenced objects are intercepted and redirected to the encrypted object cache. When a referenced object is in the cache, it is unencrypted and returned to the requester. When it is not available, a request is sent to the gateway 104 via the procedure to retrieve that object.

All side effects of the rendering procedure (e.g., the storage of HTTP cookies) may be intercepted and encrypted.

In another embodiment, de-duplication of all traffic to/from the gateway 104 is provided to minimize bandwidth consumed in communicating with the viewer. De-duplicating means, for example, detecting when data is already cached by the viewer and sending references to that data rather than transmitting the actual data. In addition, the compression of traffic to/from the gateway 104 as described may be provided to minimize bandwidth consumed in communicating with the viewer.

The page may then be rendered on the mobile device 108 by accessing all resources downloaded in the package sent from the gateway 104 in the first step of FIG. 2 locally, and initiating new requests to the gateway 104 for any resources not found. For the next data request, the mobile device 108 sends the Session ID, the URL required, and/or the App ID to the gateway 104 and then the process repeats.

FIG. 2 illustrates the features of an embodiment in terms of steps that may be considered a method. In a first step, the package is sent to the virtual device container via HTTPS from the gateway 104. In a second step, the device container decrypts and unpacks data using a predetermined compression algorithm. In a third step, the objects capable of being stored that are encrypted are stored on device for individual or each App ID. In a fourth step, App cookies or cookies are securely stored on device in the viewer 118. In a fifth step, the page on the mobile device is rendered. The system then awaits the next request.

Protocol Data Format

Figure 3:
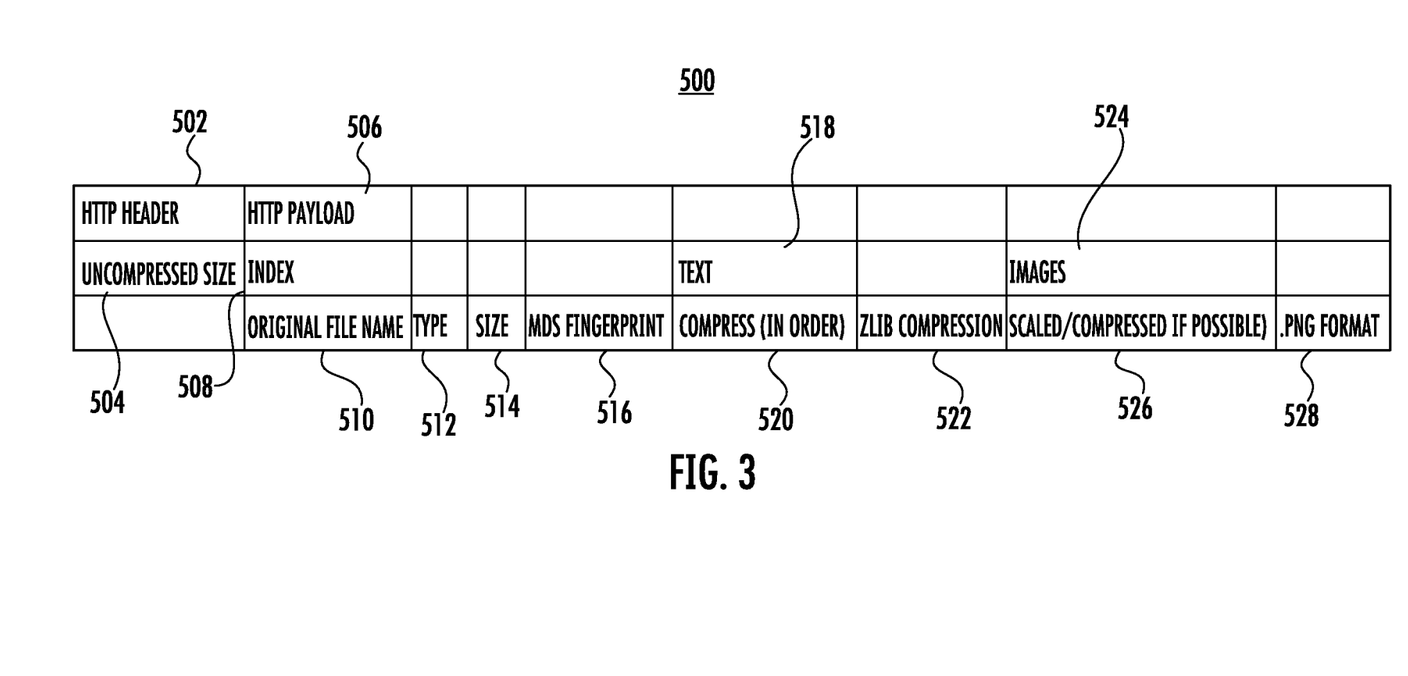
FIG. 3 illustrates an exemplary frame.

Now with respect to FIG. 3, the protocol data format 500 of one possible arrangement shall be described. The protocol format may exist as a signal transmitted over a communication line, or stored in a non-transitory memory, or other memory, such as a buffer, register, RAM, ROM, programmable memory, etc.

If the gateway 104 has identified that the request to the gateway 104 is for an app ID other than the one supplied in the incoming request, an HTTP header 502 (according to, for example, the standard format) is added to the response with the new App ID included. The header 502, for example, is used on the client side to determine if a new base URL should be used in subsequent requests. If the user navigates and address, for example, to URL http://server/app1/index.html and it links to http://server2/app2/index.html, then the gateway needs to know if a link embedded in app2/index.html to, say hello.html is destined for server or server2. The uncompressed size 504 may be used to make it easier for the client to uncompress the data efficiently.

The HTTP header 502 may include the uncompressed size 504 of the data message as illustrated. The HTTP payload 506 may include an index field 508 that carries index data. The index data may include an original file name field 510 for carrying the name, a type field 512 for carrying the type, a size field 514 for carrying the size, or an MD5 fingerprint field 516 for carrying a fingerprint. The index fields 508 beyond the file name, may be used to match references embedded in the html to files in the package. For example the type is the MIME type, a standard HTML type used to identify if a file is an html page, a CSS stylesheet, a javascript file, a PDF document, etc. The MIME standard includes dozens of types.

There may also be a Text field 518 included that may provide a compression field 520 carrying compressed data, or a Zlib compression field 522 for carrying Zlib compressed data. The Text field 518 is a "Text Encoding" field, which indicates which standard character set is used to encode the page (e.g., UTF-8; UTF-16; ASCII; etc.). The Unicode standard (UTF-*) is defined to allow embedded, internationalized characters (like Kanji), whereas legacy encodings like ASCII really only support the English alphabet. The MD5 is used to match future response packages that only include the signature and not the actual data as you describe in the next paragraph.

An images field 524 may include a scaled/compressed field 526 for carrying scaled or compressed images, or a .png field 528 for carrying .png format data. The described fields are merely examples and any combination of these fields, or omission of any field here, or additional fields is possible. In addition, it shall be appreciated that the invention does not only support .png files but also any type of image (png/jpeg/gif/etc.).

Compute Signatures and Match

As a possible additional enhancement, the gateway 104 computes a unique fingerprint for every resource that is retrieved from the Enterprise Network 106. This fingerprint may follow any standardized format—MD5 as identified in the diagram above, SHA-1, or any other open or proprietary fingerprinting technology.

The gateway 104 stores all object signatures sent to a device prior to transmitting the package. During future requests to the gateway 104, the package created only includes objects whose unique fingerprint has not previously been stored by the gateway 104. In this fashion data is "de-duplicated", such that only new data is sent from the gateway 104 to the mobile device. Other mechanisms to remove old objects or data in order to provide de-duplication.

Figure 4:
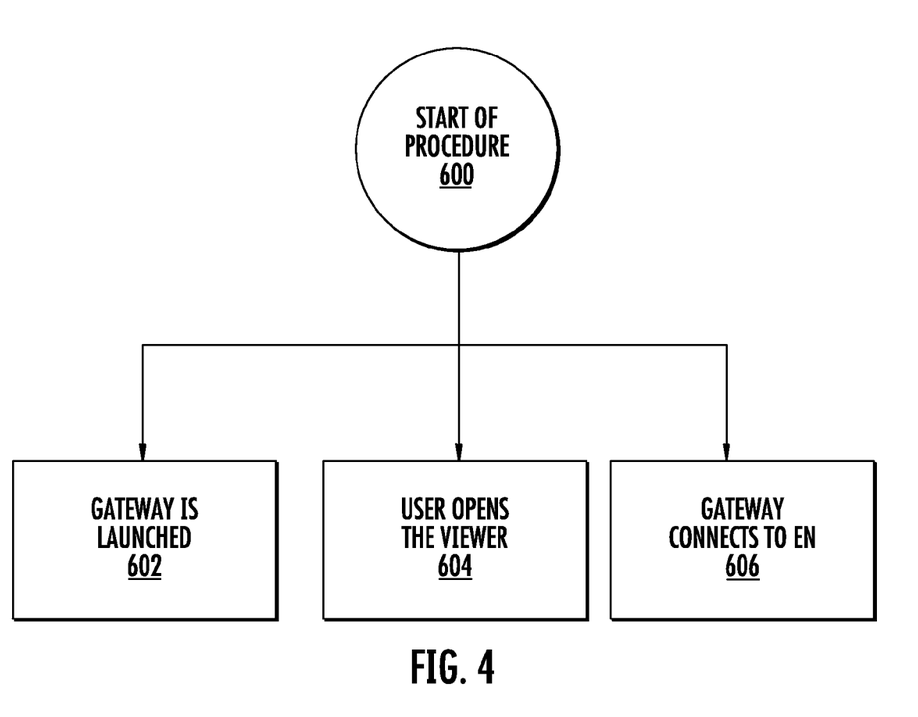
FIG. 4 illustrates an overall process flow.
Figure 5:
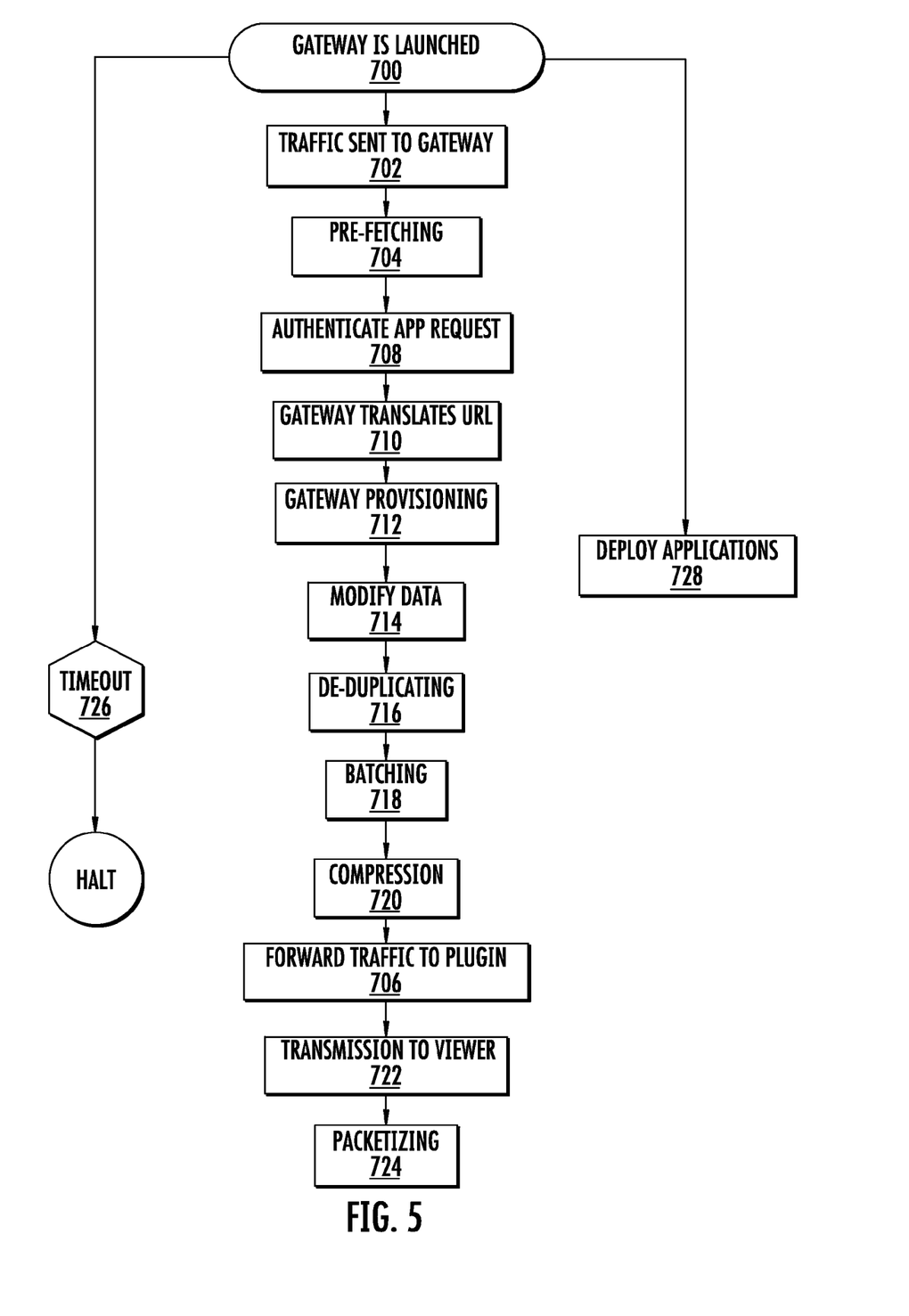
FIG. 5 illustrates a process flow for the gateway.
Figure 6:
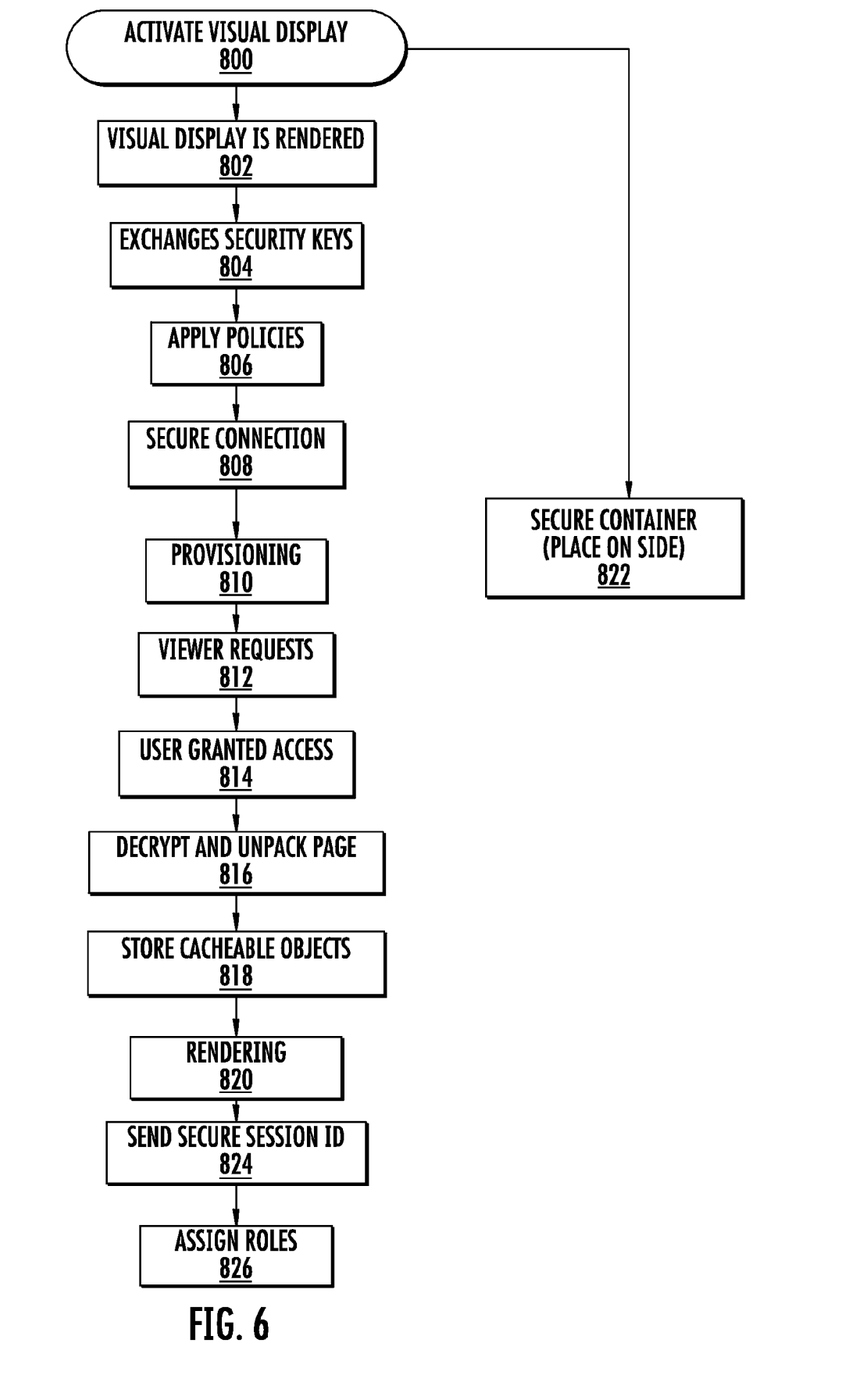
FIG. 6 illustrates a process flow for the viewer.
Figure 7:
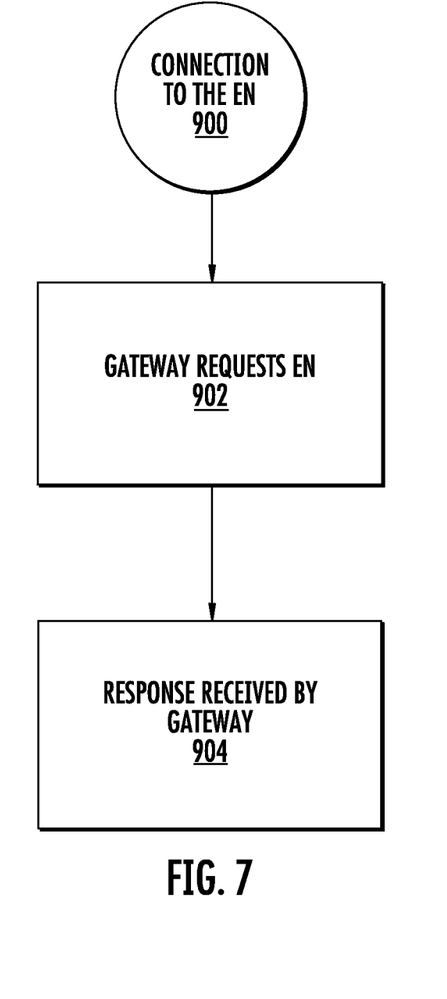
FIG. 7 illustrates a process flow to connect to the Enterprise Network.

Process flowcharts shall now be discussed with reference to FIGS. 4-7. FIG. 4 illustrates at least three instances of how the process flows may be triggered. FIG. 5 shows the first of these instances, where the gateway receives traffic. FIG. 6 sets forth the second instance where the visual display or viewer requests access to a gateway. In FIG. 7, the gateway is described to access the network or Enterprise Network.

The process flowcharts may be considered to begin in at least 1 of 3 ways as illustrated in FIG. 4 which shall be referred to as a start of process 600. In a first example, the gateway is launched 602. The gateway 104 is first launched using VPN or any similar technique for establishing a secure connection 112 as will be further described with reference to FIG. 5. In another instance 604 the user opens the visual display or viewer to begin the process flow for authentication and provisioning, which is described further with respect to FIG. 6. In yet another example 606, the gateway connects to a network or Enterprise Network. Turning to FIG. 5, the process for launching the gateway is described in more detail. Traffic is sent to the gateway in step 702 and the process begins. In an alternative embodiment, the traffic is sent via HTTPs. As already discussed, the traffic is processed on-the-fly, by inspecting data as it passes through the gateway 104. Pre-fetching 704 may be applied here to optimize the traffic stream by identifying the dependent resources referenced and fetching them from the network web servers without necessarily communicating to the viewer. These steps are not necessarily followed in the order shown or described herein, but may be in another order.

The traffic is forwarded to a plugin in step 706. When traffic arrives at the gateway 104 from the network it is forwarded to the appropriate protocol plugin based on, for example, the protocol of the originating request. In response to receiving the traffic, the gateway authenticates the application request 708. An App ID is used by the gateway 104 to authenticate the App request and to generate a full URL. In order to generate an URL, the gateway translates the URL as indicated by reference numeral 710.

Applications are provisioned by the gateway 104 in a step 712. These may be URLs describing web-based applications hosted within the intranet. They could also be, for example, services that do not have any visible user interface but are made accessible to other applications running on the mobile device 108 via the system. The gateway 104 may translate the URL supplied by the viewer 118 using the App ID to lookup the server address of the server in the Enterprise Network 106 and then append the URL path supplied in the request to the gateway 104.

Data passing through the gateway 104 may be modified traffic modified by the gateway in a step 714. For example, as HTML, javascript, CSS, and other types of resources pass through the gateway 104, the gateway 104 may modify the content of those resources by editing or adding new content to them.

De-duplicating may be provided in a step 716 that detects when data is already cached by the viewer and suppresses forwarding that data to the viewer. As already discussed, this reduces the burden on the viewer and improves overall transfer speed and, therefore, bandwidth. Speed and bandwidth are further improved in a batching operation 718 that retrieves objects through pre-fetching and assembles them into a single package prior to compression and transmission to the viewer. Further benefits in transmission are provided through compression 720 where the contents of the batched package may then be compressed. As already noted, these speed and bandwidth optimization techniques are examples and may be combined or deployed in any manner.

After the traffic is prepared for transmission by the gateway in accordance with one or more of the foregoing process flow steps, the gateway is ready to transmit the data to the viewer in a step 722. Compressed packages may be sent to the viewer via HTTPS along with HTTP header flags indicating the application from which that data was retrieved. In an alternative, the gateway packetizes the data in a step 724 and transfers packets to/from mobile device.

In an alternative arrangement, a timeout watchdog 726 halts operations if no traffic is detected after a predetermined time. In another alternative, applications are deployed to the gateway 728. The same set of Apps may be deployed to the gateway. The gateway, for example, receives unique app IDs, server addresses, and partial URLs so that the gateway 104 may generate a full, unique or partially unique URL identifying a destination address for any access of an network application from the mobile device 108.

Now turning to FIG. 6, the visual display is activated 800. The visual display may be rendered as illustrated by process flow step 802 using the available capabilities of the device. In one embodiment, the viewer receives data packages from the gateway 104 via HTTPS. When a package is received it is unencrypted and uncompressed by the viewer.

A security operation may then be initiated. In a step 804, security keys are exchanged. For example, the viewer receives an encryption key, a secure session ID, a gateway 104 URL, and/or a list of authorized applications from the controller. To further provide security, a policy may be applied to the viewer 806. The policy may define device capabilities that should be limited/disabled to protect sensitive corporate data. As illustrated by reference numeral 808, users are authorized to use the system and are uniquely identified by a username. In a step 810, the devices are provisioned in the controller as set forth above. When this is accomplished, the viewer requests the user's authentication credentials in a step 812. These credentials along with the device's attributes are sent to the controller for authentication, and in a step 814, the user is granted access, which may include providing a secure session ID, the IP address of a gateway 104 to connect to, an encryption key for on-device encryption, or a role.

The mobile device or viewer application is then ready to decrypt and unpack pages at a step 816. The viewer 118 decrypts the data according to, for example, the encryption algorithm used for the transmission (HTTPS or otherwise). Once unpacked, objects may be stored on the device in a cache that is indexed by, for example, an App ID and/or the URL path of the resource as indicated in a step 818. The page may then be rendered on the mobile device 108 by accessing all resources downloaded in the package sent from the gateway 104 as indicated by reference numeral 820.

In an alternative embodiment, there is provided a secure container 116 application to the mobile device 108 in a step 822. The secure container 116 may modify those requests or the data communicated between an application and the operating system in order to modify the functionality of the combined system.

Once authentication has been completed, a secure session may be established as indicated by reference numeral 824. This may be accomplished by sending a secure ID to one or both the mobile device 108 and the gateway 104 to, for example, create a shared secret. In order to provide further security the user may be assigned one or more roles that set a role for a particular user, such as principal, etc, as indicated by step 826.

Now turning to FIG. 7 which illustrates the process flow 900 for connection to the Enterprise Network or network. In a step 902, the gateway requests an access to the network. The gateway 104 may send an encrypted and secure request to the enterprise web server 112. This connection is secured, for example, by using VPN to securely tunnel into the Enterprise Network 106. In the other embodiment, a response received by the gateway from the network is processed in a step 904, such that the network or Enterprise web server 112 may transmit the content identified by the URL back to the gateway 104.

The connection to the Enterprise Network may be secured via VPN or because it is a direct connection into the network. At the application layer, SSL-encrypted https connections may also be supported to each specific enterprise application. For this, the application itself may be configured to support https, but it is provided here also to do so even when the gateway is directly connected to the enterprise network because large companies are concerned about insider attacks where employees snoop unencrypted traffic from within the network and they also about malware infecting internal computers/servers and sniffing the network.

As an additional feature of the HTTP protocol, the solution handles conditional requests in order to further optimize performance by sending less than full objects in the case that the object was not modified since a pre-determined time. To achieve this, in one example, the gateway 104 maintains a cache matching URLs to two pieces of protocol-standard data returned by the enterprise application when that URL is requested. One piece of data is the ETag, which is a unique signature of opaque form (i.e. the gateway 104 need not understand what it actually is) that is used to uniquely identify an object. Second, a last modified date/time is provided, which indicates when the object designated by the URL was last changed. One or both pieces of information may be supplied to the gateway 104 by the enterprise application. When the gateway 104 receives a URL from the device, it translates the URL as described, it then checks the URL cache to see if an ETag or a last modified date (or both), and then the gateway 104 sends a conditional request to the enterprise server that says, in essence "send me the object referenced by the URL if and only if it has not changed." Next, it is determined if the object has or has not changed using the available pieces of data. For example, if the ETag is use if it is available, or the last modified date is used if the ETag is not available. This optimizes performance further because when an object has not changed the destination server will simply return a short response that says "object not modified" rather than returning the full object.

Various systems, methods and apparatuses have been described. It shall be appreciated that the various features and steps may be performed in combination or individually and shall not be understood solely to the arrangement or order in which they are here described.

The invention claimed is:

1. A system to provide communication between a mobile device and an Enterprise Network, the system comprising:
    a gateway that provides an end-to-end connection between the gateway and the mobile device; and
    a controller that is adapted to interpret data from a proprietary protocol, the data being communicated between the Enterprise Network and the mobile device via the end-to-end connection;
    wherein the gateway provides authorization to an application on the Enterprise Network by combining a server URL of a server on the Enterprise Network with an application URL of the application, wherein the server URL is obtained by a lookup by the gateway with an App ID of the application.

2. The system of claim 1, wherein the mobile device interprets the data at an application level such that other network capable applications or processes running on the mobile device are limited from access to the Enterprise Network.

3. The system of claim 1, wherein the gateway encapsulates traffic inside the proprietary protocol.

4. The system of claim 1, wherein the gateway batches multiple objects into a single package.

5. The system of claim 1, wherein:
    the end-to-end connection provides a secure connection between the mobile device and the gateway.

6. The system of claim 1, wherein:
the gateway is configured to arrange the data according to the proprietary protocol.

7. The system of claim 1, further comprising:
a viewer on the mobile device, wherein the viewer interprets markup language to create a visual representation of the data on the mobile device.

8. The system of claim 1, wherein:
the gateway authorizes user access to the Enterprise Network using a role-based scheme.

9. The system of claim 1, wherein:
the gateway accesses content servers selected from a group consisting of web servers, web services, databases, FTP servers, and file servers of the Enterprise Network.

10. The system of claim 1, wherein:
the gateway includes plug-ins to support different protocols.

11. The system of claim 1, wherein:
the gateway modifies markup language of traffic destined for the mobile device to improve compatibility with a viewer on the mobile device.

12. The system of claim 1, wherein:
the gateway modifies style elements of a markup language of traffic destined for the mobile device to improve visual presentation of the data on the mobile device.

13. A method for providing communication between a mobile device and an Enterprise Network, the method comprising:
providing an end-to-end connection between a gateway and the mobile device;
interpreting data from a proprietary protocol; and
communicating the data between the Enterprise Network and the mobile device via the end-to-end connection;
wherein the gateway provides authorization to an application on the Enterprise Network by combining a server URL of a server on the Enterprise Network with an application URL of the application, wherein the server URL is obtained by a lookup by the gateway with an App ID of the application.

14. The method of claim 13, further comprising:
authorizing users of mobile devices and applications of the Enterprise Network.

15. The method of claim 13, further comprising:
modifying markup language of traffic destined for the mobile device to improve compatibility with a viewer on the mobile device.

* * * * *